United States Patent

Walther et al.

Patent Number: 5,556,911
Date of Patent: Sep. 17, 1996

[54] FILMS FROM AQUEOUS DISPERSIONS OF BLOCK COPOLYMERS HAVING HYDROGENATED CONJUGATED DIENE BLOCK

[75] Inventors: Brian W. Walther; Gary R. Marchand, both of Baton Rouge, La.

[73] Assignee: The Dow Chemical Company, Midland, Mich.

[21] Appl. No.: 427,940

[22] Filed: Apr. 26, 1995

Related U.S. Application Data

[62] Division of Ser. No. 339,862, Nov. 15, 1994.

[51] Int. Cl.$^6$ .................. C08J 3/03; C08K 5/01; C08L 53/00

[52] U.S. Cl. .......... 524/505; 524/575; 524/556; 524/484; 524/487; 525/89; 525/99; 525/316; 523/335

[58] Field of Search ........................ 524/505, 575, 524/556, 484, 487; 525/89, 99, 316; 523/335

[56] References Cited

U.S. PATENT DOCUMENTS

| | | | |
|---|---|---|---|
| 3,238,173 | 3/1966 | Bailey et al. | 260/297 |
| 3,360,599 | 12/1967 | Nyberg et al. | 260/880 |
| 3,485,787 | 12/1969 | Haefele et al. | 524/484 |
| 3,719,572 | 3/1973 | Burke | 260/819 |
| 3,726,824 | 4/1973 | Saunders et al. | 260/297 |
| 4,006,116 | 2/1977 | Dominguez | 524/484 |
| 4,199,490 | 4/1980 | Kamiya et al. | 524/505 |
| 4,386,125 | 5/1983 | Shiraki et al. | 525/314 |
| 4,970,259 | 11/1990 | Mitchell et al. | 524/505 |
| 5,068,138 | 11/1991 | Mitchell et al. | 524/505 |
| 5,120,765 | 6/1992 | Southwick et al. | 524/505 |
| 5,141,986 | 8/1992 | Southwick et al. | 524/505 |
| 5,336,712 | 8/1994 | Austgen, Jr. et al. | 524/530 |

FOREIGN PATENT DOCUMENTS

| | | |
|---|---|---|
| 0058952 | 9/1982 | European Pat. Off. . |
| 0171225 | 12/1986 | European Pat. Off. . |
| 2015249 | 10/1970 | Germany . |
| 1264741 | 2/1972 | United Kingdom . |
| 9420574 | 9/1994 | WIPO . |

*Primary Examiner*—Paul R. Michl
*Assistant Examiner*—Olga Asinovsky
*Attorney, Agent, or Firm*—Norman L. Sims

[57] ABSTRACT

Aqueous dispersions, and films prepared therefrom, comprising an organic phase of block copolymers and optional extenders wherein the block copolymers corresponds to the formula:

$$A-B-X_m-(B-A)_n$$

wherein each A is a polymer block of a monovinylidene aromatic monomer and conjugated dienes, each B is a polymer block of one or more conjugated dienes and, optionally, one or more monovinylidene aromatic monomers, X is the remnant of a multifunctional coupling agent, m is 0 or 1, and n is an integer from 1 to 5. Each A polymer block has a weight average molecular weight from 4,000 to 15,000 Daltons. Each B polymer block has a weight average molecular weight from 20,000 to 200,000 Daltons. The total monovinylidene monomer content is from 6 to 30 percent by weight of the organic phase. The effective phase volume of the A polymer block in the organic phase is from 8 to 20 percent. Thin elastomeric articles prepared from the emulsions have improved tensile strength properties. Also claimed is a process for the preparation of such films.

13 Claims, No Drawings

FILMS FROM AQUEOUS DISPERSIONS OF BLOCK COPOLYMERS HAVING HYDROGENATED CONJUGATED DIENE BLOCK

CROSS-REFERENCE TO RELATED APPLICATION

This is a divisional of application Ser. No. 08/339,862 filed Nov. 15, 1994 pending.

BACKGROUND OF THE INVENTION

The present invention relates to high-strength films prepared from aqueous dispersions of block copolymers of vinyl aromatic monomers and conjugated dienes wherein the conjugated diene block is hydrogenated.

Block copolymers of the conventional A—B—A type form strong films when cast from solutions in organic solvents. The use of aqueous dispersions or latices to form films or articles of intricate design is preferred to the use of casting from solutions because no objectionable fumes are released during the drying step. However, films of comparable thickness prepared by casting from their aqueous dispersions or latices are generally weak.

To improve the strength of such films, U.S. Pat. No. 3,360,599 taught the use of an annealing procedure. Disadvantageously, this annealing procedure requires elevated temperatures and/or long annealing times. As a consequence, the resulting films often have inferior strength properties, due to polymer degradation, and/or the time required for film formation is unacceptably long.

U.S. Pat. No. 4,199,490 teaches the addition of a second aqueous dispersion comprising a rubber, synthetic resin or a mixture thereof to enable the formation of films upon drying at room temperature. In the absence of such additive, the block copolymer dispersion did not possess adequate film-forming properties at moderate or low temperatures.

In U.S. Pat. 3,238,173, there was disclosed the preparation of concentrated aqueous dispersions by contacting the dilute latex with an aliphatic hydrocarbon that is a nonsolvent for the non-elastomeric block, removing the hydrocarbon and concentrating the latex. The use of such nonsolvents is undesirable, due to the added complexity of the process and the presence of residual organic contaminants in the resulting films.

Many block copolymers contain residual unsaturation in the conjugated diene block. Polymers containing residual unsaturation are susceptible to degradation due to exposure to ultraviolet light and/or ozone. In some applications, such degradation is unacceptable.

Accordingly, there remains a need to provide films prepared from aqueous dispersions of block copolymers having improved strength properties. In addition, it would be desirable to provide a process capable of preparing strong films from aqueous latices of block copolymers that uses relatively short times and mild temperature conditions for the annealing step to thereby avoid significant polymer degradation. It would be desirable to provide a process for the preparation of thin elastomeric articles by film deposition from a block copolymer latex that avoids the use or reduces the amount of additives. It is desirable to prepare films which have good stability in the presence of heat, ultraviolet light and ozone.

SUMMARY OF THE INVENTION

Accordingly, the present invention relates to a stable aqueous dispersion which is capable of forming a coherent, elastomeric, solid film which, after drying and annealing at 90° C. for 30 minutes, demonstrates a tensile strength of about 11.0 MPa or greater, wherein the dispersion comprises:

I. an organic phase comprising
   (a) one or more block copolymer(s) corresponding to the formula $$A—B—X_m—(B—A)_n \tag{I}$$

wherein each A is a polymer block derived from monomers comprising one or more monovinylidene aromatic monomers, each B is a polymer block derived from monomers comprising one or more conjugated dienes and, optionally, one or more monovinylidene aromatic monomers, X is the remnant of a multifunctional coupling agent, m is 0 or 1, and n is an integer from about 1 to about 5, each A polymer block has a weight average molecular weight from about 4,000 to about 15,000 Daltons, each B polymer block has a weight average molecular weight from about 20,000 to about 200,000 Daltons, wherein the block copolymer is hydrogenated such that about 99 mole percent or greater of the residual olefinic unsaturation derived from the conjugated dienes is eliminated and contains sufficient branching such that the block copolymer is elastomeric;
   (b) optionally, an extender for the block copolymer which is compatible with the B polymer block; and
wherein the organic phase contains from about 6 to about 30 percent by weight of units derived from monovinylidene aromatic monomers, and the effective phase volume of the A polymer block in the organic phase is from about 8 to about 20 volume percent; and II. a surfactant in a sufficient amount to emulsify the organic phase in water.

In another embodiment, the invention comprises a high-strength film comprising the organic phase, described hereinbefore, wherein the film exhibits a tensile strength at break of about 11.0 MPa or greater after annealing at 90° C. for 30 minutes.

In yet another embodiment, the invention comprises a process for preparing a film which comprises (1) depositing an aqueous dispersion of the invention on a surface under conditions so as to form a film, (2) removing the film from the surface and (3) annealing the film under conditions such that the annealed film exhibits tensile strength at break of about 11.0 MPa or greater.

Surprisingly, such block copolymers readily form thin films by deposition onto solid surfaces from an aqueous dispersion. Such films may be dried to form coherent, elastomeric, solid film articles having high annealed strength properties using short annealing times and mild annealing temperatures. Examples of such articles include surgical gloves, examination gloves, condoms, catheters, balloons and other thin elastomeric articles. If a tackifier and, optionally, other formulants known to one skilled in the art are combined with the block copolymer, films having adhesive properties may also be prepared. Such films may be deposited onto a thin, flexible substrate for use as pressure sensitive tapes, packaging tapes, masking tapes and labels. Such films and articles also exhibit excellent environmental and ozone stability.

DETAILED DESCRIPTION OF THE INVENTION

It has been discovered that by careful selection of the block copolymer and the total volume of the monovinylidene aromatic polymer block (A polymer block), stable aqueous emulsions can be prepared which form strong films. In selecting appropriate block copolymers, the weight average molecular weight of the monovinylidene aromatic monomer block (A polymer block) must be within the limits defined herein. If the A polymer block chain length is too high, the annealing time required to form a high-strength film becomes unacceptably long. If the A polymer block chain length is too low, the films prepared do not exhibit acceptable tensile strengths. Preferably, the A polymer block has a weight average molecular weight from about 4,000 to about 15,000 Daltons and more preferably of from about 6,500 to about 15,000 Daltons and the B polymer block has a weight average molecular weight from about 50,000 to about 120,000 Daltons. In the embodiment where the block copolymer is in radial form, the diene blocks' weight average molecular weight can range from about 50,000 to about 240,000 Daltons. The total volume of the A polymer block phase in the organic phase is important, in that, if the volume of the A polymer block is too high, stable emulsions cannot be formed using a relatively low amount of surfactants. If the A polymer block phase volume in the organic phase is too low, the films prepared from the block copolymers will not exhibit the required tensile strengths. Preferably, the amount volume of A polymer block in the organic phase is from about 8 percent to about 20 percent by volume. Most preferably, the A polymer block has an effective phase volume from about 10 to about 18 percent of the organic phase.

The A polymer block comprises one or more monovinylidene aromatic monomers. The A polymer block may comprise no more than about 1 percent by weight of an ethylenically unsaturated comonomer which polymerizes under anionic conditions. Preferably the A polymer block contains no comonomers. Preferable monovinylidene aromatic monomers for use herein include styrene and alkyl substituted derivatives of styrene. Examples include styrene, a-methylstyrene, and vinyl toluene. A more preferred monoaromatic monomer is styrene.

The B polymer block comprises 1 or more conjugated dienes and optionally monovinylidene aromatic monomers. Preferably the B block further comprise no more than about 1 percent by weight of an ethylenically unsaturated co-monomer which is copolymerizable under anionic conditions, other than a monovinylidene aromatic monomer. Preferably, the ethylenically unsaturated co-monomer useful in this invention consists of carbon and hydrogen. Conjugated dienes preferably employed in the present invention include 1,3-butadiene, isoprene or mixtures thereof. Preferably, the conjugated diene is butadiene.

Both linear and radial block copolymers are suitably employed in the invention. Most preferably, however, the block copolymers are triblock copolymers, that is, n in Formula (I) is equal to 1.

The block copolymers may be partially tapered, fully tapered or untapered polymers. By the term "tapered" is meant that the B block changes gradually from diene rich or pure diene homopolymer in the center to include increasing proportions of monovinylidene aromatic monomer in a gradual conversion towards the junction of the A polymer block (the monovinylidene aromatic polymer block) of the block copolymer and terminates in pure homopolymer of the monovinylidene aromatic monomer. Preferably the B block contains no more than 20 weight percent monovinylidene aromatic monomers and more preferably no more than 10 weight percent monovinylidene aromatic monomers. The conversion may be symmetrical or unsymmetrical with respect to the center of the B polymer block. Triblock copolymers possessing taperness at only one junction are referred to as "half-tapered" polymers.

The block copolymers used in this invention are hydrogenated to eliminate the olefinic unsaturation in the diene blocks. Preferably, a significant portion of the olefinic unsaturation is eliminated by hydrogenation while a significant portion of the aromatic unsaturation derived from the monovinylidene aromatic monomers is retained. More preferably, about 99 mole percent or greater of the olefinic unsaturation is eliminated by hydrogenation. More preferably, about 90 mole percent or greater of the aromatic unsaturation is retained. Even more preferably, about 95 mole percent or greater of the aromatic unsaturation is retained, and most preferably, about 99 mole percent or greater of the aromatic unsaturation is retained.

The block copolymers must have sufficient branching in the diene block to prevent formation of crystalline domains to retain the elastomeric properties of the block copolymer. As used herein, "branching" means after polymerization, lower alkyl substituents are pendant from the portion of the block copolymer derived from dienes. For example, if isoprene is used to prepare the desired diene block, methyl groups are pendant from the chain. Where a straight-chain conjugated diene, such as butadiene, is used, there must be a sufficient amount of 1,2-addition to prevent formation of crystalline domains. 1,2-Addition results when the polymerization occurs through one olefinic bond rather than through both olefinic bonds. When polymerization occurs through one olefinic bond, an unsaturated group is pendant from the polymer chain. Where a straight-chain conjugated diene is used, the 1,2-addition is preferably about 25 mole percent or greater, more preferably about 30 mole percent or greater and most preferably about 35 mole percent or greater. If too much branching is present, the resultant polymer is no longer elastomeric. Preferably, the 1,2-addition is about 60 percent or less and more preferably about 50 percent or less. The amount of 1,2-addition for butadiene can be increased by the use of a polar solvent in the polymerization. Preferably, only a portion of the solvent used is polar. A preferable solvent for this purpose is tetrahydrofuran.

"Derived from monomers," as used herein, means that the polymer block(s) referred to comprise the residue of the monomers referred to in the polymer block. Residue refers to the portion of the monomer which remains in the polymer block after polymerization.

"Organic phase," as used herein, refers to all of the hydrocarbon based materials in the emulsion, except the surfactant. Such materials include the block copolymers and any optional extender.

A blend of two or more block copolymers may be used in this invention. All of the block copolymers used preferably have A polymer blocks which have weight average molecular weights in the range of from about 4,000 to about 15,000 Daltons. The composition weighted average units derived from monovinylidene aromatic monomers content of the blended copolymers is preferably from about 6 to about 30 percent by weight. One or more of the components may have A polymer blocks derived from monovinylidene aromatic monomers content outside of the stated range, provided the average is within the stated range.

In the embodiment wherein one of the block copolymers in such a blend contains units derived from monovinylidene aromatic monomers at a level above 30 weight percent, it is preferred that such content be about 40 weight percent or less and, more preferably, about 35 weight percent or less. Preferably, the total amount of block copolymer, having an A polymer block content above about 30 percent by weight, is about 35 percent by weight or less and, more preferably, about 30 percent by weight or less.

The block copolymers can be blended in bulk and thereafter emulsified. Optionally, the block copolymers may be emulsified separately and the emulsions can be blended. Methods of blending the bulk block copolymers or aqueous emulsions of the block copolymers are well known in the art.

In some embodiments of the invention, the one or more block copolymers may have an effective phase volume of the A polymer block in the organic phase which is greater than desired. In order to reduce the phase volume of the A polymer block in the organic phase, an extender may be blended with the block copolymer.

Extenders useful in the invention are non-volatile organic materials which are compatible with the B polymer block, that is, such extenders are soluble in the B polymer block or form a single phase with the B polymer block. Further, useful extenders do not degrade the properties of the films prepared from the aqueous emulsions of the invention such that the tensile strengths are less than 11.0 MPa after the films are annealed at 90° C. for 30 minutes.

Among preferred extenders are hydrocarbon oils, polymers or oligomers derived from monomers having olefinic unsaturation compatible with the B polymer block, or mixtures thereof. More preferred extenders are the aliphatic hydrocarbon and naphthenic oils with the most preferred class of extenders being the aliphatic hydrocarbon oils. The preferred aliphatic hydrocarbon and naphthenic oils are selected according to the ultimate end-use and the cost of such oils. Among preferred oils are Tufflo™ 6065 mineral oil (trademark of Atlantic Richfield Company) and Shellflex™ 371 mineral oil (trademark of Shell Oil Company).

The preferred polymers useful as extenders include styrene-ethylene-butene diblock, polyethylene vinyl acetate copolymers, ethylene and methacrylate copolymers, ethylene-propylene diene monomer based polymers, and ethylene-styrene copolymers. Other preferred polymers include polyisoprene, polybutadiene, styrene-butadiene random copolymers and hydrogenated forms of such polymers. Most preferred polymers include polyisoprene, polybutadiene and the hydrogenated forms of such polymers.

The extenders are present in a sufficient amount to achieve the desired effective phase volume of the A polymer block. If too much extender is used, the films prepared from the aqueous emulsions would not meet the tensile strength requirements. The amount of extender is preferably about 45 percent by weight or less of the organic phase, more preferably, about 40 percent by weight or less and, even more preferably, about 35 percent by weight or less. If present, the extender is preferably present in an amount of about 5 percent by weight or greater of the organic phase and, preferably, 10 percent by weight or greater.

The extender can be blended with the block copolymer in bulk and the blend can be emulsified. Alternatively, the extender and block copolymers can be separately emulsified and the emulsions can be blended to achieve the desired organic phase composition. In yet another embodiment, the extender may be added directly to an emulsion of the block copolymers. Methods of performing such blending are well known in the art.

To achieve the required organic phase composition, a blend of two or more copolymers and one or more extenders may be used in combination.

Effective phase volume or volume percent of the A polymer blocks in the organic phase may be less than the weight percent of units derived from monovinylidene aromatic monomers in such copolymers. Especially if one or more of the polymers is tapered, the A polymer blocks are more compatible and, therefore, more soluble in the phase containing the B polymer block of the resulting multiple phase structure compared to pure monovinylidene aromatic homopolymer blocks. Due to such solubility, the volume of the phase segregated A polymer block is less than the content of the units derived from monovinylidene aromatic monomer expressed by weight. Accordingly, the percentage of the A polymer blocks in the organic phase, measured as a volume percent, is less than the percentage of units of monovinylidene aromatic monomer as measured by weight.

In order to determine the volume percent of the A polymer block, the corresponding weight percentage of units derived from monovinylidene aromatic monomer is divided by a correction factor. The correction factor is a value equal to the sum of ratios of each monomer's content in weight percent divided by the respective density of a homopolymer of such monomer. For a two-component block copolymer, this may be expressed as follows:

$$\% \ (vol_a) = \% \ (wt_a)/D_a/(\% \ (wt_a)/D_a + \% \ (wt_b)/D_b) \tag{II}$$

where:

% $(vol_a)$ is the effective phase volume in percent for the monovinylidene aromatic polymer block;

% $(wt_a)$ and % $(wt_b)$ are the respective weight percent contents of monovinylidene aromatic monomer and hydrogenated diene monomer in the block copolymer; and $D_a$ and $D_b$ are the respective densities of homopolymers, the monovinylidene aromatic monomer and hydrogenated diene monomer.

In those embodiments where an extender is present, the effective phase volume of the A polymer block in the organic phase is represented by Formula III:

$$\% \ (vol_a) = \% \ (wt_a)/D_a/(\%(wt_a)/D_a + \% \ (wt_b)/D_b + \% \ (wt_e)/D_e) \tag{III}$$

where:

% $(wt_e)$ is the weight percent extender present, and $D_e$ is the density of the extender present.

For tapered block copolymers, the above numerator is further multiplied by a correction factor equal to 1-τ (where τ is the degree of taperness) to account for the isolated monovinylidene aromatic polymer content. The degree of taperness in the block copolymer is the percentage of total monovinylidene aromatic polymer units that are isolated. Such isolated monovinylidene aromatic polymer units are those segments of monovinylidene aromatic polymer surrounded on both sides by conjugated diene polymer units and are easily determined by the use of nuclear magnetic resonance spectroscopy as disclosed in Mochel, *Rubber Chemistry and Technology*, Vol. 40, p. 1200 (1967). Because such isolated polymer units do not contribute significantly to the phase represented by the polymer block A (monovinylidene aromatic polymer block), tapered block copolymers can possess an effective monovinylidene aromatic polymer phase volume that is significantly less than the weight percent monovinylidene aromatic monomer content.

At lower monovinylidene aromatic polymer block effective phase volumes, especially for polymers wherein the monovinylidene aromatic polymer block molecular weight is relatively low, the tensile properties of the resulting films are unacceptably low. At higher monovinylidene aromatic polymer block effective phase volumes, the dispersion does not readily form films, especially at mild temperatures from 25° C. to 90° C. Moreover, films from such polymers require longer periods of time under annealing conditions and/or higher annealing temperatures to achieve maximum tensile strength properties. Such films are subject to polymer degradation resulting in films possessing poor tensile properties, especially ultimate tensile strength.

Preferably, the weight average molecular weight ($M_w$) of the block copolymers is about 45,000 Daltons or greater to 240,000 Daltons, more preferably, about 50,000 or greater, most preferably, about 55,000 or greater. Preferably, the weight average molecular weight of the block copolymers is about 430,000 or less, more preferably 300,000 Daltons or less, even more preferably 240,000 Daltons or less, even more preferably about 200,000 or less and most preferably 180,000 Daltons or less. In the embodiment where the block copolymer is a radial block copolymer, the weight average molecular weight is preferably about 300,000 or less. In measuring the molecular weights of copolymers herein, the technique employed is that of gel permeation chromatography (GPC) using polystyrene standards. The molecular weights for the styrene blocks are based on the polystyrene standards. The molecular weights for all other blocks are based on the polystyrene standards and corrected according to Runyon et al. vs. *Applied Polymer Science*, 13, p. 2359 et. seq. 1969, and L. H. Tung, J. *Applied Polymer Science* 24, 953 (1979) both incorporated herein by reference.

It is believed (without agreeing to be bound by such belief) that when the monovinylidene aromatic polymer blocks possess the previously stated effective phase volume, the monovinylidene aromatic polymer blocks coalesce, thereby causing the polymer matrix to possess a particulated or spherical morphology instead of a cylindrical or lamellar morphology. Such morphology is desirable for the formation of films from latexes having good strength properties and film formation rates. Such morphology as well as the concept of polymer block phase volume, are disclosed in S. L. Aggarwal, *Block Polymers*, Plenum Press, pp. 102–103, (1970). It is further believed (without agreeing to be bound by such belief) that the particulated or spherical morphology which is present in the A polymer block is the discontinuous phase which facilitates the formation of stable emulsions and strong films.

Block copolymers and techniques for their preparation are well known in the art. Such polymers may be prepared by sequential anionic polymerization utilizing alkyllithium initiators, such as n-butyl-lithium and sec-butyllithium. They may also be prepared by coupling of living block copolymers or by using soluble difunctional lithium initiators such as 1,3-phenylene-bis(3-methyl-1-phenylpentylidene)-bis-(lithium), or similar initiator as disclosed in U.S. Pat. No. 4,196,154 (incorporated herein by reference). The block copolymers may be tapered or untapered. That is, the junction between the separate blocks may be gradual or abrupt. Untapered block copolymers may be formed by completely polymerizing each monomer component before adding the next block-forming monomer to the reaction medium containing the living polymer anion. Tapered block copolymers may be formed by copolymerizing a mixture of the monomers using the previously mentioned difunctional initiators. Due to the differing reactivities of the monomers, a relatively pure diene block initially forms, followed by an intermediate portion of such polymer containing increasing amounts of interspersed monovinylidene aromatic polymer and, finally, a relatively pure monovinylidene aromatic polymer block.

After polymerization according to one of the foregoing anionic polymerization techniques, the living polymer anion is terminated by addition of a terminating agent containing a reactive hydrogen, or coupled by a coupling agent containing multiple leaving groups. Preferable terminating agents include water, alcohols and carboxylic acids. Preferable coupling agents include ethylene dibromide, methylene chloride, carbon tetrachloride, silicon tetrachloride and dichlorodimethylsilane. Additional additives can be added to the reaction mixture before or after the polymerization is completed for purposes of stabilizing the polymer, preventing discoloration or for any other suitable purpose. The polymerization is normally conducted in an organic solvent such as hexane, toluene, cyclohexane, benzene or a mixture thereof.

The block copolymers can be hydrogenated by conventional methods of hydrogenation. The hydrogenation is preferably carried out using molecular hydrogen and a catalyst based on metals or metal salts of Group VIII of the Periodic Table. It may be affected in the heterogeneous phase, for example, using Raney nickel, or in the homogeneous phase using a catalyst based on salts, in particular carboxylates, alkoxides or enolates of cobalt, nickel or iron, which are combined with metal alkylates, in particular aluminum alkylates. Other useful catalysts include organo metallic titanium compounds, see U.S. Pat. Nos. 3,920,745, 4,980,421 and 4,673,714, incorporated herein by reference; among such catalysts are bis(cyclopentadienyl)titanium compounds, see U.S. Patents 5,141,997 and 5,039,755, incorporated herein by reference. Processes for the selective hydrogenation of block copolymers are described in U.S. Pat. No. 4,595,749; 3,595,942; 3,113,986 and 4,226,952, incorporated herein by reference.

To isolate the hydrogenated polymer, the polymerization mixture can be heated directly to dryness or, alternatively, treated with steam with the solvent being distilled off. It can also be precipitated in an excess of a non-solvent, for example, ethanol, and isolated mechanically and dried or worked up by devolatilization in an extruder.

The hydrogenation may be conducted at temperatures from about 5° C. to about 200° C. and at pressures from 0.1 atm to 80 atm. Preferred temperatures are from about 40° C. to about 140° C. and preferred pressures are from about 0.5 atm to about 20 atm. Contact times will range from about 0.01 hour to about 10 hours in the treating steps and from about 0.01 to about 14 hours in the phase separation step, but preferred contact times are about 0.02 hour to about 1 hour in the treating step and about 0.02 to about 1 hour in the phase separation step.

Surfactants useful in the invention are those which emulsify the block copolymer(s) and optional diluent in water. Anionic, cationic and nonionic surfactants may be used, with the anionic and cationic surfactants being preferred. Even more preferred surfactants are the $C_{12-30}$ saturated and unsaturated carboxylic acids or salts thereof, sulfated alkylphenoxypoly(ethyleneoxy)ethanol, alkali or ammonium salts and dialkyl esters of alkali metal sulfosuccinic acid (for example Aerosol™ OT dioctyl ester of sodium sulfosuccinic acid, available from American Cyanamid). Even more preferred are the $C_{12-30}$ saturated and unsaturated carboxylic acids or salts thereof. Preferred counterions are the alkali metals and ammonium ions and more preferred are potassium ions. Among the most preferred surfactants are stearic acid, linoleic acid, linolenic acid, lauric acid, oleic acid (for example, Industrene™ 105 oleic acid, available from Humko Chemical), alkali metal salts of disproportionated rosin (for example, Dresenate™ 214 potassium salt of disproportionated rosin, predominantly abietic acid). Preferably, the surfactants have a hydrophilic-lipophilic-balance (HLB) of about 15 or greater and, more preferably, an HLB of about 18 or greater. HLB is described in and can be determined according to Becker Emulsions: Theory and Practice, pp. 232–251, Krieger Publishing Co., Huntington, N.Y. (1977).

The surfactant is present in a sufficient amount to emulsify the Block copolymer(s) and optional diluent. If too much surfactant is used to prepare the aqueous emulsions, films prepared from the aqueous emulsions will not demonstrate the desired tensile properties. The reason is that a significant amount of the surfactant may remain in the film which is formed from the aqueous emulsion. The maximum amount of surfactant useful is related to how much surfactant is retained in the film. More than this amount may be used if the excess portion is removed prior to film formation or can be leached from the film prior to annealing. Preferably, about 0.5 percent by weight or more of surfactant, based on the organic phase, is present and, more preferably, 1 percent by weight or more is present and, even more preferably, about 2 percent by weight or more is present. Preferably, about 10 percent by weight or less of surfactant, based on the organic phase, is used, more preferably, about 8 percent by weight is used and, even more preferably, about 6 percent by weight or less is used. Where a portion of the surfactant is removed prior to film formation, up to about 20 percent by weight may be used, provided no more than about 10 percent by weight is present in the final film.

To produce an aqueous dispersion, the polymer, usually in the form of a solution in an organic solvent, is dispersed in water using a suitable surfactant and the organic solvent is removed. One suitable procedure is previously disclosed in U.S. Pat. No. 3,238,173 incorporated herein by reference. Emulsification can take place by any of the well-known means for this purpose and the specific means utilized does not form an essential aspect of the present invention.

In one embodiment, block copolymer and optional diluent dissolved in organic solvent are emulsified in water. Thereafter, the solvent is removed to form a latex comprising the block copolymer and the optional diluent in water. In some embodiments, the block copolymer is produced in an organic solvent and the solution of block copolymer in organic solvent produced in the manufacturing process is emulsified in water. Preferably, the polymer concentration in organic solvent is about 8 percent by weight or greater and more preferably about 10 percent by weight or greater. Preferably, the polymer concentration in this embodiment is about 30 percent by weight or less and, more preferably, about 24 percent by weight or less.

In another embodiment, the solution of the block copolymer in organic solvent can be treated to concentrate the block copolymer to a level of about 35 percent by weight or greater and, more preferably, about 40 percent by weight or greater. The concentration of block copolymer in solution is about 70 parts by weight or less and, more preferably, about 60 parts by weight or less. The block copolymer solution may require heating to render it processable.

The viscosity of the block copolymer solution must be such that the polymer solution can be processed. Preferably, the block copolymer solution has a viscosity of about 1,000 centipoise or greater, more preferably about 10,000 centipoise or greater and, even more preferably, about 25,000 centipoise or greater. Preferably, the block copolymer solution has a viscosity of about 80,000 centipoise or less, more preferably, about 50,000 centipoise or less and, even more preferably, about 35,000 centipoise or less. One skilled in the art would recognize that the apparent viscosity of such block copolymer solutions is lower when subjected to high shear conditions and the values above reflect the viscosity under low shear conditions. In the embodiment where the block copolymer solution is concentrated, the desired viscosity is achieved by heating the solution to an elevated temperature, preferably, about 25° C. or greater and, more preferably about 45° C. or greater. Preferably, such temperature is about 100° C. or less and, most preferably about 90° C. or less. If the temperature required to achieve the desired viscosity is near or above the boiling point of water or the combined solvent and water, it is desirable to perform the emulsification under pressure to prevent boiling. The concentrated solution is emulsified in water using a high shear mixer.

Emulsification of the polymer solution into a water continuous phase may be accomplished at a wide range of percent polymer solution concentrations. The optimum concentration is dependent upon the mechanical device used to prepare the emulsion. Thereafter, the block copolymer and optional diluent are contacted with water and surfactant with agitation to emulsify the mixture. After emulsification, the solvent is removed by conventional means, such as rotary evaporation or vacuum distillation.

In one embodiment the emulsions of block copolymers in water can be used to prepare films and preferably, the solids level of the organic phase in water is about 20 percent by weight or greater and, more preferably, about 28 percent by weight or greater. Preferably, the solids level is about 75 percent by weight or less, more preferably, about 65 percent by weight or less.

Generally, the number average size of the resulting polymer particles is less than about 5.0 µm, more preferably from about 0.3 to about 2.0 µm as measured using a Coulter Counter Model Multisizer IIe with a 30 µm aperture tube. Preferably, the polymer particles (the dispersed polymer particles in the aqueous medium) are spherical in shape.

In another embodiment, the emulsion of the block copolymers can be used to coat substrates. Such substrates include films, metals, rigid polymeric articles and the like. Emulsion useful as coatings generally require a lower polymer concentration than those used to prepare films. The concentration should be high enough such that a continuous coating can be applied to the substrate, yet not so high as to form a film on the substrate. Such coatings preferably have a thickness of about 0.05 mm or greater and more preferably about 0.1 mm or greater. Preferably, such coatings have a thickness of about 2 mm or less and, more preferably, about 1 mm or less. Coatings according to this invention can be applied by conventional means such as by spraying, rolling or painting the coating on the substrate or alternatively dipping the substrate into a bath of the coating.

To prepare a film from the emulsions, a suitable form having a surface in the shape of the desired resulting product (optionally having a surface coating of a suitable substance to promote film removal and/or emulsion deposition as previously known in the art) is coated with the emulsion and the water is thereafter removed by evaporation. A preferred emulsion for use in the manufacture of dipped goods in the foregoing manner contains from about 20 to about 70 weight percent of the organic phase, more preferably from about 25 to about 60 weight percent. A second or further layer may be applied in the same manner to achieve thicker films.

The film resulting from the foregoing procedure may be dried and annealed, if desired, by any suitable technique, especially by heating. Preferable temperatures for drying and annealing are from about 25° C. to about 130° C., more preferably, from about 30° C. to about 120° C. and, most preferably, from about 50° C. to about 100° C. Suitable times for drying and annealing are from about 1 minute to about 10 hours, preferably from about 1 minute to about 60 minutes. At higher temperatures, shorter drying and annealing times are required. The drying and annealing steps of the process may be conducted simultaneously or separately. For example, multiple film layers may be deposited and dried before the resulting structure is annealed.

Alternatively, films may be prepared by casting methods which are well known in the art. In brief, a latex of the invention is cast to a desired thickness on a surface from which the film can be subsequently removed. The water is allowed to evaporate. Evaporation can be accelerated by the use of increased temperature or air flow over the sample. In one embodiment the film is removed from the surface before annealing.

The film thickness is determined by the ultimate use. The desired film thickness for the uses for which the films of the invention may be used are well known in the art. Preferably, the films have a thickness of about 0.10 mm or greater and, more preferably, about 0.20 mm or greater. Preferably, the films are about 3.0 mm or less and, most preferably, about 2 mm or less.

The films of this invention preferably exhibit a tensile strength at break of about 11.0 MPa or greater after annealing at 90° C. for about 30 minutes. More preferably, the films exhibit a tensile strength of about 16.5 MPa or greater and, most preferably, about 21 MPa or greater when annealed under such conditions. Tensile strengths are measured according to ASTM-412-87.

Films having adhesive properties may be prepared by incorporating a suitable tackifier, usually a low molecular weight organic polymer such as a polyterpene or similar compound, in the film. Additional formulants such as oils may also be added to modify the adhesive properties of the resulting film. The tackifiers and other formulants may be added to the polymer solution or incorporated into the emulsion. The resulting modified emulsion may be further concentrated and coated onto a substrate such as a masking tape backing. The substrate/film combination may thereafter be dried and optionally annealed to form the final product.

Having described the invention, the following examples are provided as further illustration and are not to be construed as limiting. Unless stated to the contrary, parts and percentages are expressed on a weight basis. Effective phase volumes were calculated using the previously disclosed Formulae (II and III). For such calculations, the densities of the respective polymer blocks is: polystyrene block 1.047 and ethylene-butene block 0.85.

EXAMPLE

The SEBS triblock was prepared by hydrogenating a styrene-butadiene-styrene block copolymer having two styrene chains with an MW of 11,500 Daltons and a central butadiene chain of 56,000 Daltons. The SEBS polymer nominally contained 30 percent oil (Witco 200 oil).

The styrene-co-ethylene-butene-styrene triblock copolymer (SEBS) was dissolved in cyclohexane to form a 16 percent by weight solids solution. The volume of styrene in the organic phase is 17.2 percent.

This SEBS stock solution was emulsified using a Silverson Model L4R high shear mixer batchwise. A mixture emulsified consisting of 800 grams of SEBS stock solution (128 grams polymer), 512 grams of water, and 6.8 grams of a surfactant, dioctyl sulfosuccinate sodium salt were mixed at maximum rpm (nominally 5000 rpm) for 5 minutes. During the mixing step, 0.3 milliliters of a defoamer was added to prevent excessive foaming.

The solvent removal was accomplished by vacuum devolatilization in a rotating glass apparatus with a bath temperature of 90° C. The finished emulsion, after filtering, was analyzed at 28 percent solids and was added to an agitated tank. The agitation was sufficient to mix the solution but did not introduce any air bubbles into the artificial latex.

A glass mold at 90° C. with a slightly toughened surface was dipped into a calcium nitrate and methanol solution (nominally 10 percent solids), removed and allowed to cool to room temperature. The mold was dipped into the artificial latex with a dwell time of 5 seconds and removed and placed for a minimum of 5 minutes into a water tank which was maintained at 40° C. The wet film was dried and annealed in a forced air oven at 90° C. for a minimum of 20 minutes and then removed and tested.

The film was free of any holes and possessed a tensile strength of greater than 3000 psi (21 MPa) tensile. The film was tested for real-time ozone resistance. The ozone resistance test entails die cutting 6 pieces of polymer film from the previously described film. The die used is a standard tensile die of 2 ½"×½" (6.4 cm×1.34 cm) (ASTM D 1822 Type L with ½" (1.34 cm) tabs). The thin portion of the film was stretched and secured at either 12.5 percent, 50 percent, or 100 percent of the relaxed length. Two samples at each elongation were prepared. The films prepared did not fail after 2400 hours at 12.5, 50 and 100 percent elongations.

What is claimed is:

1. An aqueous dispersion which is capable of forming a coherent, elastomeric, solid film which, after drying and annealing at 90° C. for 30 minutes, demonstrates a tensile strength of 11.0 MPa or greater wherein the dispersion comprises:

I. an organic phase comprising
one or more block copolymer(s) corresponding to the formula:

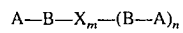

A—B—X$_m$—(B—A)$_n$ wherein each A is a polymer block derived from monomers comprising one or more monovinylidene aromatic monomers and each B is a polymer block derived from monomers comprising one or more conjugated dienes and, optionally, one or more monovinylidene aromatic monomers, X is the remnant of a multifunctional coupling agent, m is 0 or 1, and n is an integer from 1 to 5, wherein each A polymer block has a weight average molecular weight from 4,000 to 15,000 Daltons, each B polymer block has a weight average molecular weight from 20,000 to 200,000 Daltons wherein the block copolymer(s) are hydrogenated such that 99.0 percent or greater of the residual olefinic unsaturation derived from the conjugated dienes is eliminated and contains sufficient branching such that the block copolymer is elastomeric; and II. a surfactant in a sufficient amount emulsify the organic phase;

wherein the effective phase volume of the A polymer block in the organic phase is from about 8 to about 20 volume percent.

2. A dispersion according to claim 1 wherein the organic phase further comprises an extender comprising a naphthenic oil, aliphatic hydrocarbon oil or a polymer compatible with the B block of the copolymer.

3. A dispersion according to claim 1 wherein the surfactant is present in an amount of from 0.5 to 10 percent by weight.

4. A dispersion according to claim 3 wherein the block copolymer is derived from styrene and 1,3-butadiene or isoprene.

5. A dispersion according to claim 4 wherein the effective phase volume of the A polymer blocks in the organic phase is from about 10 to about 18 volume percent.

6. A dispersion according to claim 5 wherein the weight average molecular weight of the one or more block copolymers is from about 50,000 to about 300,000 Daltons.

7. A dispersion according to claim 6 wherein the surfactant is a $C_{12-30}$ carboxylic acid or salt thereof having an HLB of 15 or greater.

8. A dispersion according to claim 1 which comprises two or more block copolymers and a surfactant wherein each A polymer block of the two or more block copolymers has a weight average molecular weight of from about 6,500 to about 15,000 Daltons.

9. A dispersion according to claim 8 wherein the surfactant is present in an amount of from about 0.5 to about 10 percent by weight.

10. A dispersion according to claim 9 wherein the A polymer block is derived from styrene and the B polymer block is derived from 1,3-butadiene or isoprene.

11. A dispersion according to claim 9 wherein the effective phase volume of the A polymer blocks in the organic phase is from about 10 to about 18 percent.

12. A dispersion according to claim 11 wherein the weight average molecular weight of the block copolymers is from about 50,000 to about 300,000 Daltons.

13. A dispersion according to claim 12 wherein the surfactant is a $C_{12-30}$ carboxylic acid or salt thereof having an HLB of about 15 or greater.

* * * * *